(12) United States Patent
Smith et al.

(10) Patent No.: US 7,290,614 B2
(45) Date of Patent: Nov. 6, 2007

(54) METHODS FOR EFFECTING CONTROLLED BREAK IN PH DEPENDENT FOAMED FRACTURING FLUID

(75) Inventors: Michael W. Smith, Addison, TX (US); John M. Terracina, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 176 days.

(21) Appl. No.: 11/159,910

(22) Filed: Jun. 23, 2005

(65) Prior Publication Data

US 2006/0289165 A1 Dec. 28, 2006

(51) Int. Cl.
*E21B 43/26* (2006.01)
*E21B 43/27* (2006.01)

(52) U.S. Cl. ............... 166/300; 166/307; 166/308.6; 166/309; 507/202; 507/244; 507/254; 507/255; 507/259; 507/260; 507/267; 507/902

(58) Field of Classification Search ............... 166/300, 166/307, 308.6, 309; 507/202, 244, 254, 507/255, 259, 260, 267, 902
See application file for complete search history.

(56) References Cited

U.S. PATENT DOCUMENTS

| | | | | |
|---|---|---|---|---|
| 4,202,795 | A | 5/1980 | Burnham et al. | 252/332 |
| 4,506,734 | A | 3/1985 | Nolte | 166/308 |
| 4,741,401 | A | 5/1988 | Walles et al. | 166/300 |
| 4,770,796 | A | 9/1988 | Jacobs | 252/8.553 |
| 4,919,209 | A | 4/1990 | King | 166/300 |
| 4,961,466 | A | 10/1990 | Himes et al. | 166/250 |
| 5,164,099 | A | 11/1992 | Gupta et al. | 252/8.551 |
| 5,373,901 | A | 12/1994 | Norman et al. | 166/300 |
| 5,385,206 | A * | 1/1995 | Thomas | 166/267 |
| 6,286,601 | B1 * | 9/2001 | Argillier et al. | 166/309 |
| 6,454,008 | B1 | 9/2002 | Chatterji et al. | 166/308 |
| 6,460,632 | B1 * | 10/2002 | Chatterji et al. | 175/66 |
| 6,966,379 | B2 * | 11/2005 | Chatterji et al. | 166/308.6 |
| 6,986,392 | B2 * | 1/2006 | Chatterji et al. | 166/300 |
| 2004/0200616 | A1 | 10/2004 | Chatterji et al. | 166/267 |
| 2005/0043188 | A1 | 2/2005 | Chatterji et al. | 507/100 |
| 2005/0077047 | A1 | 4/2005 | Chatterji et al. | 166/300 |
| 2006/0166836 | A1 * | 7/2006 | Pena et al. | 507/211 |
| 2007/0034378 | A1 * | 2/2007 | Welton et al. | 166/308.6 |

OTHER PUBLICATIONS

Presentation on ReversaFoam Surfactant (Formerly FDP-S704-03) in the Halliburton Technology Bulletin.
U.S. Appl. No. 10/396,606, filed Oct. 1, 2004, Chatterji, et al.
U.S. Appl. No. 10/956,928, filed Oct. 1, 2004, Chatterji, et al.
U.S. Appl. No. 10/683,644, filed Oct 10, 2003, Chatterji, et al.

* cited by examiner

*Primary Examiner*—George Suchfield
(74) *Attorney, Agent, or Firm*—Robert A. Kent; Crutsinger & Booth

(57) ABSTRACT

The invention provides a fluid for use in a subterranean formation penetrated by a wellbore, the fluid comprising: (a) water; (b) delayed release acid; (c) a surfactant comprising a tertiary alkyl amine ethoxylate generally represented by the following formula:

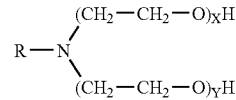

wherein R is an alkyl group or groups, X is about 2 to about 15, and Y is about 2 to about 15; and (e) a gelling agent. The invention also provides a method of fracturing a subterranean formation, comprising the step of forming a foamed fracturing fluid comprising water; a surfactant comprising a tertiary alkyl amine ethoxylate generally represented by the formula above; a gelling agent; and a gas. The method also provides the step of introducing the foamed fracturing fluid into a subterranean formation at a pressure sufficient to create a fracture in the subterranean formation. The method also provides the step of introducing an acid into the subterranean formation.

16 Claims, No Drawings

METHODS FOR EFFECTING CONTROLLED BREAK IN PH DEPENDENT FOAMED FRACTURING FLUID

CROSS-REFERENCE TO RELATED APPLICATIONS

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

This invention generally relates to recovering hydrocarbons from subterranean formations. More specifically, the invention relates to methods of fracturing a subterranean formation using a fracturing fluid that defoams in response to a change in pH.

BACKGROUND OF THE INVENTION

Hydrocarbon (e.g., oil, natural gas, etc) in a subterranean formation can be recovered by drilling a well into the subterranean formation. Hydrocarbon in the subterranean formation is driven into the well to be produced by, for example, pressure gradients that exist between the formation and the well, the force of gravity, displacement of the fluids using pumps or the force of another fluid injected into the well. The production of hydrocarbon is commonly increased by hydraulically fracturing the subterranean formation. In hydraulic fracturing, a viscous fracturing fluid is pumped into a well at a rate and pressure sufficient to form fractures that extend into the formation, providing additional pathways through which the fluids can flow into the well and be recovered.

The fracturing fluid is usually a water-based fluid containing a gelling agent to increase the viscosity of the fluid. The gelling agent reduces the leakage of liquid from the fractures into the subterranean formation. The gelling agent is commonly a polymeric material that absorbs water and forms a gel as it undergoes hydration.

In addition, particulate matter known as proppant, e.g., graded sand, bauxite, or resin coated sand, is typically dispersed throughout the fracturing fluid. Fracturing fluid has been developed for its proppant carrying capacity, fluid loss control, and high viscosity. The proppant is suspended in the fracturing fluid and becomes deposited into the fractures created by the pressure exerted on the fracturing fluid. The presence of the proppant in the fractures holds the fractures open after the pressure has been released. Otherwise, the fractures would close, rendering the fracturing operation useless. Ideally, the proppant has sufficient compressive strength to resist crushing.

Foamed fracturing fluid is one type of fracturing fluid that has a relatively large volume of gas dispersed in a relatively small volume of liquid. Foamed fracturing fluid also includes a surfactant for facilitating the foaming and stabilization of the foam produced when the gas is mixed with the liquid. The most commonly used gases for foamed fracturing fluids are nitrogen and carbon dioxide because they are non-combustible, readily available, and relatively cheap.

The procedure used to fracture a subterranean formation with foamed fracturing fluid includes pumping the foamed fracturing fluid into a well at a pressure sufficient to fracture the formation and then relieving the pressure at the wellhead to reduce the pressure of the fracturing fluid, or defoam the fracturing fluid. Upon the defoaming of the fracturing fluid, the proppant suspended therein is released into the resulting fractures. This reduction of the pressure on the foam is referred to as "breaking" the foam, which results in the fluid being carried back into the well by a rush of expanding gas. However, controlling the defoaming or breaking of the fracturing fluid to properly release the proppant can be difficult.

One type of foamed fracturing fluid has been developed that is advantageously controlled by change of pH. Thus, upon lowering the pH of the pH-dependent foamed fracturing fluid, the foam is broken, or defoamed, which results in the fluid being carried back into the well by a rush of expanding gas. Such pH-dependent, foam fracturing fluids are further discussed in Halliburton's U.S. patent application Ser. No. 10/396,606, filed Mar. 25, 2003, entitled "Recyclable Foamed Fracturing Fluids and Methods of Using the Same;" Halliburton's Pub. No. US 2005/0043188, entitled "Recyclable Foamed Fracturing Fluids and Methods of Using the Same"; Halliburton's Pub. No. US 2005/0077047 entitled, "Methods of Fracturing a Subterranean Formation Using a pH Dependent Foamed Fracturing Fluid"; and Halliburton's Pub. No. US 2004/0200616 entitled, "Recyclable Foamed Fracturing Fluids and Methods of Using the Same," all of which are incorporated by reference in their entirety.

A method is needed to defoam the pH-dependent foamed fracturing fluid after the hydraulic fracture treatment is completed.

SUMMARY OF THE INVENTION

The invention provides a fluid for use in a subterranean formation penetrated by a wellbore, the fluid comprising: (a) water; (b) delayed release acid; (c) a surfactant comprising a tertiary alkyl amine ethoxylate generally represented by the following formula:

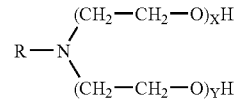

wherein R is an alkyl group or groups, X is about 2 to about 15, and Y is about 2 to about 15; and (d) a gelling agent.

The invention also provides a method of fracturing a subterranean formation, comprising the step of forming a foamed fracturing fluid comprising water; a surfactant comprising a tertiary alkyl amine ethoxylate generally represented by the following formula:

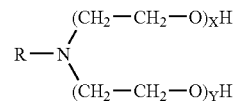

wherein R is an alkyl group or groups, X is about 2 to about 15, and Y is about 2 to about 15; a gelling agent;

and a gas. The method also provides the step of introducing the foamed fracturing fluid into a subterranean formation at a pressure sufficient to create a fracture in the subterranean formation. The method also provides the step of introducing an acid into the subterranean formation.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION OF THE PREFERRED EMBODIMENTS

Conventional methods of breaking the pH-dependent foamed fracturing fluid is via pH lowering minerals or formation water, which work to lower the pH of the fracturing fluid. Thus, once a pH-dependent foamed fracturing fluid has been foamed, it is introduced into the subterranean formation, where it undergoes a lowering in pH, for example upon in situ contact with a naturally occurring material in the subterranean formation that is sufficient to cause its pH to change. Once defoamed, the fracturing fluid flows back to the surface with very little or no foam. This method for defoaming the pH-depending foamed fracturing fluid, however, is sometimes ineffective when the formation being fractured has high pH formation water, little to no water production, and/or no pH lowering minerals.

The foamed fracturing fluid of the invention comprises water, a surfactant, a delayed release acid, and a gelling agent. The invention also provides a method of defoaming a pH-depending foamed fracturing fluid after the hydraulic fracture treatment is completed. The method for defoaming a pH-depending foamed fracturing fluid is especially advantageous when the formation being fractured has high pH formation water, little to no water production, and/or no pH lowering minerals. In these scenarios, the invention's method of defoaming a pH dependent fracturing fluid is especially advantageous.

A foamed fracturing fluid is herein defined as a fracturing fluid that contains gas dispersed in a liquid. The volume of gas that can be dispersed in the liquid depends on the quality of the foam. It should be understood that "subterranean formation" encompasses both areas below exposed earth and areas below earth covered by water such as sea or ocean water.

The fracturing fluid is preferably a water-based composition having a balance of water after taking other components of the fracturing fluid into account. The fracturing fluid can contain produced water, fresh water or salt water such as brines and seawater.

The delayed release acid for use in the invention causes a decrease in the pH of the foamed fracturing fluid, which facilitates the reduction of the foam. The delayed release acid for use in the invention can be any acid that is capable of providing a delayed release of acid in the fracturing fluid. The delayed release acid decreases the pH of the foamed fracturing fluid to sufficiently convert the foaming surfactant to a defoaming surfactant, whereby the foamed fracturing fluid substantially defoams. The delayed release acid is preferably selected such that the release of the acid is sufficiently delayed to allow the foamed fracturing fluid to be injected through the wellbore and into the formation before the delayed release acid would be expected to reduce the pH of the foamed fracturing fluid to less than about 8 under the temperature conditions of the formation.

Examples of delayed release acid for use in the invention include, but are not limited to citric acid, malic acid, glycolic acid, lactic acid, tartaric acid, gluconic acid, glyceric acid, mandelic acid, any salts thereof, and any mixtures thereof in any proportion. Of the foregoing acids, lactic acid is the most preferred delayed release acid, and is included in the fracturing fluid in an amount in the range of from about 0.1% to about 1.0% by volume of the liquid phase of the resulting fracturing fluid.

In one embodiment, the delayed release of the acid is accomplished by encapsulating an acid with a material that allows for delayed release of the acid after wearing of the capsule. In this embodiment, any acid can be used in the invention which is capable of being encapsulated by the capsule and, upon wearing of the capsule, provide a decrease in the pH of the foamed fracturing fluid. For example, the capsule can comprise an enclosure member that is sufficiently permeable to at least one fluid existing in the formation or in the fracturing fluid; such that the enclosure member is capable of dissolving or eroding off upon sufficient exposure to the fluid, thereby releasing the acid.

There are many ways of encapsulating an acid and providing for a delayed release of the acid into the fracturing fluid. For example, a latex paint could be used to encapsulate an acid and allow slow release of the acid in the fluid, thereby acting as a delayed release acid. Examples of some delayed release mechanisms are disclosed in U.S. Pat. No. 4,202,795 assigned to Halliburton that issued May 13, 1980; U.S. Pat. No. 4,506,734 assigned to The Standard Oil Company that issued Mar. 26, 1985; U.S. Pat. No. 4,741,401 assigned to The Dow Chemical Company that issued May 3, 1988; U.S. Pat. No. 4,770,796 assigned to Petrolite Corporation that issued Sep. 13, 1988; U.S. Pat. No. 4,919,209 assigned to Dowell Schlumberger Inc. that issued Apr. 24, 1990; U.S. Pat. No. 5,164,099 assigned to the Western Company of North America that issued Nov. 17, 1992; U.S. Pat. No. 5,373,901 assigned to Halliburton that issued Dec. 20, 1994, all of which are incorporated by reference in their entirety.

In addition, chelated materials can be used to provide a delay mechanism for the slow release of the acid in the fracturing fluid. Such chelated materials include triethyl citrate, dimethyl glutarate, dimethyl succinate, dimethyl adipate, and dibasic esters.

The delayed release acid can be introduced into the formation prior to, concurrent with, or subsequent to introduction of the foamed fracturing fluid to achieve the desired change in pH and resultant defoaming. Preferably, the delayed release acid is introduced concurrently with the foamed fracturing fluid. The required amount of acid to defoam the foamed fracturing fluid depends on the amount of surfactant that is used to foam the fracturing fluid. The amount of surfactant that is used to foam the fracturing fluid, in turn, depends on the required degree of foam stability. The degree of foam stability is measured by the half-life of the foam.

The surfactant enables the fracturing fluid to be foamed with a gas at a first pH and defoamed at a second pH. The foamed fracturing fluid can be foamed and defoamed by simply changing its pH.

One surfactant that can be used in the fracturing fluid is a tertiary alkyl amine ethoxylate. Tertiary alkyl amine ethoxylate can be changed from a foaming surfactant (i.e., a surfactant that facilitates foaming of the fracturing fluid) to a defoaming surfactant (i.e., a surfactant that facilitates defoaming of the fracturing fluid) by the addition of a hydrogen ion. It can then be changed back to a foaming surfactant by the addition of a hydroxide ion. The following formula represents the ability of the tertiary alkyl amine ethoxylate to be changed from a foaming surfactant to a defoaming surfactant:

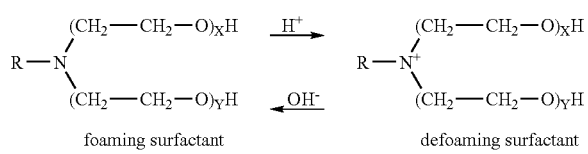

foaming surfactant        defoaming surfactant where R is an alkyl group or groups having from about 12 to about 14 carbon atoms and X and Y vary from about 2 to about 15, preferably from about 10 to about 15. Triton RW-100 surfactant (X and Y=10) and Triton RW-150 surfactant (X and Y=15) are examples of tertiary alkyl amine ethoxylate that can be purchased from Dow Chemical Company.

In another embodiment, the foamed fracturing fluid comprises an amphoteric surfactant and an anionic surfactant. The relative amounts of the amphoteric surfactant and the anionic surfactant in the surfactant mixture are from about 32 to about 45% by weight of the surfactant mixture and from about 55 to about 68% by weight of the surfactant mixture, respectively. As used throughout the specification, "%" represents "percent." The amphoteric surfactant can comprise lauryl amine oxide, a mixture of laurylamine oxide and myristylamine oxide (laurylamine/myristylamine oxide), cocoamine oxide, lauryl betaine, oleyl betaine, cocoamido propyl betaine, any mixture thereof in any proportion, with the laurylamine/myristylamine oxide being preferred. Such amine oxides are generally represented by the formula:

$R-N^+O^-$ where R is $C_{12}$ (lauryl), $C_{12-14}$ (lauryl/myristyl), or $C_{8-12}$ (coca). Further, such betaines are generally represented by the formula:

$R-N^+-CH_2-CH_2-COO^-$ where R is $C_{12}$ (lauryl) or $C_{18}$ (oleyl). Such amine oxides and betaines are commercially available from Chemron, a Lubrizol Co., of Paso Robles, Calif. The anionic surfactant can comprise $C_{4-12}$ alcoholether sulfate, α-olefin sulfonate, sulfonated $C_{15}$ alcohol substituted with from about 12 to about 40 moles of ethylene oxide, sodium lauryl-2-sulfate, sodium lauryl-3-sulfate, and any mixtures thereof in any proportion, e.g., $C_{4-12}$ alcohol ether sulfate containing 1.5 to 3 moles of ethylene oxide combined with the α-olefin sulfonate ($C_{12-14}[OH]SO_3^-Na^+$), with the alcohol ether sulfate and the α-olefin sulfonate being preferred.

The first pH at which the foamed fracturing fluid comprising the amphoteric surfactant and the anionic surfactant foams is in the range of at least about 11. When the foamed fracturing fluid is foamed, its pH is initially in the first pH range. Thus, it can be foamed and conveyed to a subterranean formation via a wellbore.

After the foamed fracturing fluid passes downhole, the delayed release acid is "released" and lowers the foamed fracturing fluid within the second pH range, causing a reduction or defoaming of the foamed fracturing fluid. The second pH, which is the pH at which the foamed fracturing fluid defoams, is less than about 8.

The amount of surfactant present in the water preferably ranges from about 0.1% to about 1.0% by volume of the liquid phase which is typically water. The particular amount of the surfactant used in the fracturing fluid depends on the required degree of foam stability, which is directly proportional to the half-life of the foam.

The particular pH at which the fracturing fluid can be foamed by the addition of a gas and the particular pH at which it undergoes defoaming depend on the nature of the surfactant. In an embodiment, the pH of the foamed fracturing fluid when it is formed (first pH) and the pH of the foamed fracturing fluid when it is defoamed (second pH) are each basic. In one aspect of this embodiment, the first pH is at least about 11 and the second pH is less than about 8.

In an embodiment, the first pH at which the fracturing fluid is formed is in the range of at least about 11 with a half-life of the fracturing fluid at the first pH greater than about 15 minutes.

The second pH at which the fracturing fluid defoams is in the range of less than about 8 with a half-life of the fracturing fluid at the second pH less than about 2 minutes.

Without being limited by theory, it is believed that the surfactant facilitates the formation of foam when the fracturing fluid is at a first pH by reducing the surface tension between the gas and the liquid therein, thus promoting and stabilizing the gas-liquid dispersion. On the other hand, the surfactant facilitates reduction of the foam when the fluid is changed to a second pH. Further, it is believed that, at the second pH, the fracturing fluid does not have the ability to reduce the surface tension between the gas and the liquid.

In addition, the fracturing fluid includes a gelling agent, also known as a viscosifying agent. As used herein, "gelling agent" refers to a material capable of forming the fracturing fluid into a gel, thereby increasing its viscosity. The amount of the gelling agent present in the fracturing fluid can range from about 0.125 to about 0.375% by weight of the water. Examples of suitable gelling agents include, but are not limited to, natural or derivatized polysaccharides that are soluble, dispersible, or swellable in an aqueous liquid, modified celluloses and derivatives thereof, and biopolymers. Examples of polysaccharides include, but are not limited to: galactomannan gums such as guar gum, locust bean gum, gum ghatti, gum karaya, tamarind gum, and tragacanth gum; depolymerized gums such as depolymerized guar gum; modified gums such as carboxyalkyl derivatives, e.g., carboxymethylguar, and hydroxyalkyl derivatives, e.g., hydroxyethyl guar, hydroxypropylguar, and carboxymethyl guar; and doubly derivatized gums such as hydroxypropyl carboxymethyl guar and hydroxyethyl carboxymethyl guar. Examples of water-soluble cellulose ethers include, but are not limited to, methylcellulose, carboxymethyl cellulose, hydroxyethyl cellulose, and hydroxyethyl carboxymethyl celluose. Examples of biopolymers include, but are not limited to, xanthan gum and welan gum.

Examples of other suitable gelling agents include, but are not limited to, water dispersible hydrophilic organic polymers having molecular weights ranging from about 100,000 to about 10,000,000 such as polyacrylamide and polymethacrylamide, wherein about 5% to about 7.5% are hydrolyzed to carboxyl groups and a copolymer of about 5% to about 70% by weight acrylic acid or methacrylic acid copolymerized with acrylamide or methacrylamide.

Examples of additional suitable gelling agents include, but are not limited to, water soluble polymers such as a terpolymer of an ethylenically unsaturated polar monomer, an ethylenically unsaturated ester, and a monomer selected from acrylamido-2-methylpropane sulfonic (AMPS) acid or N-vinylpyrrolidone; and a terpolymer of an ethylenically unsaturated polar monomer, an ethylenically unsaturated ester, AMPS acid, and N-vinylpyrrolidone. Other suitable gelling agents are polymerizable water soluble monomers, such as acrylic acid, methacrylic acid, acrylamide, and methacrylamide.

Preferred gelling agents include depolymerized guar gum, guar gum, locust bean gum, hydroxyethyl guar, hydroxypropyl guar, hydroxyethyl carboxymethyl guar, hydroxpropyl carboxymethyl guar, carboxymethyl guar, hydroxyethyl cellulose, hydroxyethyl carboxymethyl cellulose, carboxymethyl cellulose, methyl cellulose, xanthan gum, and welan gum. In an embodiment, the gelling agent is depolymerized guar gum prepared by subjecting hydroxypropyl guar to oxidative degradation with hydrogen peroxide. In an embodiment, the depolymerized guar gum prepared as a solution where the activity of the polymer ranges from 11-12%. A 2% solution by volume of the depolymerized guar gum in distilled water will yield a viscosity of from about 8 to 25 cp measured by a Fann 35 viscometer equipped with a 1/5 spring.

The amount of gelling agent present in the fracturing fluid is preferably in the range of from about 10 to about 30 pounds (lbs)/1,000 gallons (gal) of fracturing fluid. Additional disclosure regarding the foregoing gelling agents can be found in U.S. Pat. No. 6,454,008 assigned to Halliburton that issued on Sep. 24, 2002, which is incorporated by reference herein in its entirety.

The fracturing fluid can be foamed by adding gas to the fracturing fluid while pumping it into a wellbore that penetrates the subterranean formation. The gas can be, for example, nitrogen. Other gasses such as carbon dioxide are also contemplated for use in the invention.

A bacteriacide can also be added to the fracturing fluid for the purpose of preventing or alleviating a bacterial attack. Examples of suitable bacteriacides include, but are not limited to, glutaric aldehyde and hexahydro-1,3,6-tris(hydroxyethyl)-S-triazne. The concentration of the bactericide added to the fracturing fluid preferably ranges from about 0.1 to about 0.15 gallon of bactericide per 1,000 gallons of the water.

The foamed fracturing fluid can also comprise a proppant for preventing fractures formed in the subterranean formation from closing. Examples of suitable proppants include, but are not limited to, resin coated or uncoated sand, sintered bauxite, ceramic materials, and glass beads. The proppant is preferably present in the fracturing fluid in an amount ranging from about 1 to about 10 pounds/gallon of the fluid, alternatively from about 5 to about 10 pounds/gallon of the fluid. It is also contemplated that the proppant can be introduced into the wellbore before or after the foamed fracturing fluid has been introduced into the wellbore.

The fracturing fluid described above can be formed by combining its components, including the water, the surfactant, the gelling agent, and the proppant in any order. By way of example, the water can be combined with the gelling agent, followed by adding the surfactant to the resulting mixture. The proppant can then be added to the fracturing fluid before foaming the fluid.

In one embodiment, the invention provides for a method of fracturing a subterranean formation, comprising forming a foamed fracturing fluid comprising water, a surfactant comprising a tertiary alkyl amine ethoxylate generally represented by the following formula as indicated above, wherein R is an alkyl group or groups, X is about 2 to about 15, and Y is about 2 to about 15; a gelling agent; and a gas. The method also comprises introducing the foamed fracturing fluid into a subterranean formation at a pressure sufficient to create a fracture in the subterranean formation. The method also comprises introducing an acid into the subterranean formation.

The fracturing fluid can be a fracturing fluid that once foamed, the foamed fracturing fluid is pumped to the subterranean formation at a pump pressure sufficient to exceed the fracturing gradient and fracture the subterranean formation. The fracturing fluid can be pumped downhole for a period of time sufficient to achieve a desired amount of fracture geometry in the subterranean formation. A proppant can be combined with the fracturing fluid before pumping it downhole such that the proppant becomes suspended in the foam.

Also within the scope of the invention is a delayed release acid that is introduced into the subterranean formation prior to or subsequent to introducing the foamed fracturing fluid. In these embodiments, the delayed release acid need not be introduced along with the foamed fracturing fluid. It should be understood by those skilled in the art that if the acid is introduced subsequent to the introduction of the foamed fracturing fluid, that in these embodiments, the acid need not be a delayed release acid.

The invention also provides a method of making a foamed fracturing fluid for use in a subterranean formation penetrated by a well, the foamed fracturing fluid comprising: (a) foaming a fracturing fluid, wherein the foamed fracturing fluid comprises water, a surfactant as described above, and a gelling agent; (b) introducing the foamed fracturing fluid into the subterranean formation; and (c) introducing an acid into the subterranean formation.

The acid comes into contact with the delayed release acid that causes a lowering of the pH of the fracturing fluid. This lowering in the pH of the fracturing fluid in turn causes its viscosity to be reduced, resulting in the dissipation of the foam in the fracturing fluid. Due to the static condition of the defoamed fracturing fluid and to gravity, the proppant begins settling such that it becomes deposited in the fractures of the subterranean formation. In turn, the proppant holds the fractures open during the subsequent production of oil, water, or natural gas from the formation.

It should be understood by those skilled in the art that the fracturing fluid can be re-foamed and recycled to the same or a different subterranean formation to fracture that formation as described previously.

After careful consideration of the specific and exemplary embodiments of the present invention described herein, a person of ordinary skill in the art will appreciate that certain modifications, substitutions and other changes can be made without substantially deviating from the principles of the present invention. The detailed description is illustrative, the spirit and scope of the invention being limited only by the appended Claims.

What is claimed is:

1. A method of fracturing a subterranean formation, comprising the steps of:
   a) forming a foamed fracturing fluid comprising:
      i) water;
      ii) a surfactant comprising a tertiary alkyl amine ethoxylate generally represented by the following formula:

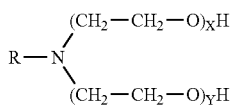

wherein R is an alkyl group or groups, X is about 2 to about 15, and Y is about 2 to about 15;

iii) a gelling agent; and iv) a gas;

b) introducing the foamed fracturing fluid into a subterranean formation at a pressure sufficient to create a fracture in the subterranean formation; and c) introducing an acid into the subterranean formation; wherein the step of forming a foamed fracturing fluid further comprises the step of forming a foamed fracturing fluid further comprising delayed release acid; and wherein the step of introducing an acid into the subterranean formation comprises the step of introducing the foamed fracturing fluid having the delayed release acid therein into the subterranean formation; and wherein the delayed release acid comprises a chelated material selected from the group consisting of triethyl citrate, dimethyl glutarate, dimethyl succinate, dimethyl adipate, dibasic esters, and any mixtures in any proportion thereof.

2. The method according to claim 1, wherein the foamed fracturing fluid has a first pH of at least 11.

3. The method according to claim 1, wherein the delayed release acid decreases the pH of the foamed fracturing fluid to less than about 8.

4. The method according to claim 1, wherein the delayed release acid decreases the pH of the foamed fracturing fluid to sufficiently convert the foaming surfactant to a defoaming surfactant, whereby the foamed fracturing fluid substantially defoams.

5. The method according to claim 1, wherein the delayed release acid is encapsulated in a material that slowly releases the acid.

6. The method according to claim 1, wherein the foamed fracturing fluid further comprises an amphoteric surfactant and an anionic surfactant.

7. The method according to claim 6, wherein the amphoteric surfactant is selected from the group consisting of lauryl amine oxide, a mixture of laurylamine oxide and myristylamine oxide (laurylamine/myristylamine oxide), cocoamine oxide, lauryl betaine, oleyl betaine, cocoamido propyl betaine, and any mixtures thereof in any proportion.

8. The method according to claim 6, wherein the anionic surfactant is selected from the group consisting of $C_{4-12}$ alcoholether sulfate, α-olefin sulfonate, sulfonated $C_{15}$ alcohol substituted with from about 12 to about 40 units of ethylene oxide, sodium lauryl-2-sulfate, sodium lauryl-3-sulfate, and any mixtures thereof in any proportion.

9. A method of fracturing a subterranean formation, comprising the steps of:

a) forming a foamed fracturing fluid comprising:

i) water;

ii) a surfactant comprising a tertiary alkyl amine ethoxylate generally represented by the following formula:

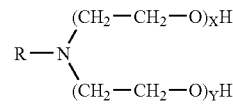

wherein R is an alkyl group or groups, X is about 2 to about 15, and Y is about 2 to about 15;

iii) a gelling agent; and iv) a gas;

b) introducing the foamed fracturing fluid into a subterranean formation at a pressure sufficient to create a fracture in the subterranean formation; and c) introducing a delayed release acid into the subterranean formation, wherein the delayed release acid comprises a chelated material selected from the group consisting of triethyl citrate, dimethyl glutarate, dimethyl succinate, dimethyl adipate, dibasic esters, and any mixtures in any proportion thereof.

10. The method according to claim 9, wherein the foamed fracturing fluid has a first pH of at least 11.

11. The method according to claim 9, wherein the delayed release acid decreases the pH of the foamed fracturing fluid to less than about 8.

12. The method according to claim 9, wherein the delayed release acid decreases the pH of the foamed fracturing fluid to sufficiently convert the foaming surfactant to a defoaming surfactant, whereby the foamed fracturing fluid substantially defoams.

13. The method according to claim 9, wherein the delayed release acid is encapsulated in a material that slowly releases the acid.

14. The method according to claim 9, wherein the foamed fracturing fluid further comprises an amphoteric surfactant and an anionic surfactant.

15. The method according to claim 14, wherein the amphoteric surfactant is selected from the group consisting of lauryl amine oxide, a mixture of laurylamine oxide and myristylamine oxide (laurylamine/myristylamine oxide), cocoamine oxide, lauryl betaine, oleyl betaine, cocoamido propyl betaine, and any mixtures thereof in any proportion.

16. The method according to claim 14, wherein the anionic surfactant is selected from the group consisting of $C_{4-12}$ alcoholether sulfate, α-olefin sulfonate, sulfonated $C_{15}$ alcohol substituted with from about 12 to about 40 units of ethylene oxide, sodium lauryl-2-sulfate, sodium lauryl-3-sulfate, and any mixtures thereof in any proportion.

* * * * *